(12) United States Patent
Mizell, III et al.

(10) Patent No.: US 12,268,200 B2
(45) Date of Patent: Apr. 8, 2025

(54) UNIVERSAL SMALL INSECT VECTOR TRAP

(71) Applicant: University of Florida Research Foundation, Inc., Gainesville, FL (US)

(72) Inventors: Russell F. Mizell, III, Monticello, FL (US); Xavier P. Martini, Tallahassee, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 101 days.

(21) Appl. No.: 16/910,201

(22) Filed: Jun. 24, 2020

(65) Prior Publication Data
US 2020/0404896 A1 Dec. 31, 2020

Related U.S. Application Data

(60) Provisional application No. 62/946,505, filed on Dec. 11, 2019, provisional application No. 62/866,071, filed on Jun. 25, 2019.

(51) Int. Cl.
*A01M 1/02* (2006.01)
*A01M 1/10* (2006.01)

(52) U.S. Cl.
CPC ............ *A01M 1/023* (2013.01); *A01M 1/103* (2013.01); *A01M 1/106* (2013.01)

(58) Field of Classification Search
CPC ...... A01M 1/023; A01M 1/103; A01M 1/106; A01M 1/02; A01M 1/026
See application file for complete search history.

(56) References Cited

U.S. PATENT DOCUMENTS 1,867,252 A * 7/1932 Crigler .................. A01M 1/103
43/121
3,987,577 A * 10/1976 Hardee ................... A01M 1/02
43/121

(Continued)

FOREIGN PATENT DOCUMENTS

BR        PI0904375 A2 *  7/2011
KR       20130069909 A  *  6/2013   .............. A01M 1/02

OTHER PUBLICATIONS

Merged translation of KR-20130069909-A (Year: 2013).*

(Continued)

*Primary Examiner* — Peter M Poon
*Assistant Examiner* — Danielle A Clerkley
(74) *Attorney, Agent, or Firm* — Thomas | Horstemeyer, LLP

(57) ABSTRACT

A universal insect trap having multiple points of entry is described being capable of capturing various types and sizes of insects. The universal insect trap may be used to capture and preserve target species such that genomes can be analyzed for specimens, which is beneficial in determining infection rates, strains of a vector or a pathogen, identifying associated microorganisms, determining or monitoring natural enemies, etc. The universal insect trap can include a base having a cone-shaped body, where the base includes a sloped surface. Further, the universal insect trap can include a dome portion and a trap portion. The trap portion can include an annular ring, a mounting portion, a vial, and an aggregation pheromone positioned in the trap portion, where the aggregation pheromone is one that emits a predetermined amount of pheromones over time to attract at least one predetermined type of insect.

20 Claims, 11 Drawing Sheets

(56) References Cited

U.S. PATENT DOCUMENTS

| | | | | |
|---|---|---|---|---|
| 4,611,425 | A * | 9/1986 | Dickerson | A01M 1/04 43/121 |
| 5,033,229 | A * | 7/1991 | Demarest | A01M 1/2011 43/132.1 |
| 5,231,792 | A * | 8/1993 | Warner | A01M 1/106 43/122 |
| 5,992,087 | A | 11/1999 | Chu et al. | |
| 6,112,452 | A * | 9/2000 | Campbell | A01M 1/04 43/107 |
| 6,112,454 | A * | 9/2000 | Plato | A01M 1/02 43/121 |
| 6,216,383 | B1 * | 4/2001 | Klabunde | A01M 1/103 43/107 |
| 6,393,760 | B1 * | 5/2002 | Lingren | A01N 31/14 43/107 |
| 6,920,716 | B2 * | 7/2005 | Kollars, Jr. | A01M 1/22 43/107 |
| 7,150,125 | B1 | 12/2006 | Mizell, III | |
| 7,412,797 | B1 * | 8/2008 | Hiscox | A01M 1/02 43/107 |
| 7,886,481 | B2 * | 2/2011 | Schneidmiller | A01M 1/106 43/132.1 |
| 8,677,677 | B2 * | 3/2014 | Schneidmiller | A01M 1/04 43/132.1 |
| 2005/0016055 | A1 * | 1/2005 | Moyle | A01M 1/026 43/132.1 |
| 2005/0155277 | A1 * | 7/2005 | Bagnall | A01M 1/106 43/113 |
| 2012/0204475 | A1 * | 8/2012 | Schneidmiller | A01M 1/04 43/113 |
| 2012/0294828 | A1 * | 11/2012 | Zhang | A01M 1/106 424/84 |
| 2013/0340319 | A1 * | 12/2013 | AlAyedh | A01M 1/106 43/107 |
| 2016/0242403 | A1 * | 8/2016 | Gaugler | A01N 25/24 |
| 2017/0094960 | A1 * | 4/2017 | Sasaki | A01M 1/023 |

OTHER PUBLICATIONS

Chu, C. and T. Henneberry, Arthropod Management, "Development of a New Whitefly Trap," Journal of Cotton Science, 2:104-109 (1998).

Chu, C., P. Pinter, Jr., T. Henneberry, K. Umeda, E. Natwick, Y. Wei, V. Reddy and M. Shrepatis, "Use of the CC trap with Different Trap Base Colors for Silverleaf Whiteflies (*Homoptera: aleyrodidae*), thrips (*Thysanoptera: thripidae*), and Leafhoppers (*Homoptera: cicadellidae*)," Journal of Economic Entomology, 93(4): 1329-1327 (2000).

Chu, C., M Ciomperlik, N. Chang, M. Richards, and T. Henneberry, "Developing and Evaluating Traps for Monitoring Scirtothrips Dorsalis (*Thysanoptera: thripidae*)," Fla. Entomologist, 89(1): 47-55 (2006).

Mizell et al. 2002. Trolling: a novel trapping method for *Chrysops* spp. (*Diptera: tabanidae*), Fla. Entomol. 85(2): 356-366) (http://journals.fcla.edu/flaent/article/view/75098).

* cited by examiner

UNIVERSAL SMALL INSECT VECTOR TRAP

CROSS-REFERENCE TO RELATED APPLICATIONS

This application claims the benefit of and priority to U.S. Provisional Patent Application No. 62/866,071 entitled "UNIVERSAL SMALL INSECT VECTOR TRAP," filed Jun. 25, 2019, and U.S. Provisional Patent Application No. 62/946,505 entitled "UNIVERSAL SMALL INSECT VECTOR TRAP," filed Dec. 11, 2019, the contents of which being incorporated by reference in their entireties herein.

BACKGROUND

Insect traps are beneficial in obtaining information about plants, such as crops planted in a field. For instance, insect traps can be used to determine whether a disease is present in a field, or if a disease is advancing through different parts of the life cycle. As insects have varying sizes, behaviors, and other characteristics, most insect traps are specific to a particular type of insect. As such, collecting different types of insects using a single trap remains problematic.

FIELD OF THE INVENTION

The present disclosure relates to a universal insect trap capable of capturing and preserving insects that can be used to determine the presence, quantify the populations and related biological parameters of the vectors of various plant diseases, as well as other types of insects.

BRIEF SUMMARY OF THE INVENTION

In a first embodiment of the present disclosure, a universal insect trap is described, where the universal insect trap includes a base having a cone-shaped body. The base can include a sloped surface. Further, the base can include a bottom portion wider than a top portion of the cone-shaped body. The base includes a hollow interior and an outlet positioned on a top surface of the base portion. A dome portion having a semi-circular body can be positioned on a top end of the base, where the dome portion includes an exterior surface that is partially opaque and partially transparent in some embodiments.

A trap portion can be positioned between the base portion and the dome portion, the trap portion including an annular ring. The annular ring can include a circumference similar to an inner circumference of an inner surface of the dome portion such that the annular ring and the dome portion define an interior space within the dome portion. Further, the trap portion can include a mounting portion having a rim wider than a width of the outlet of the body such that the mounting portion retains the dome portion and the trap portion on the body. The mounting portion can include a plurality of navigation channels for ingress by at least one insect.

Further, the trap portion can include a vial positioned below the mounting portion, the vial extending through the outlet and into the hollow interior of the base portion. The annular ring and the mounting portion can define an aperture that slopes downward to an interior of the vial, causing insects to fall into the vial which can be filled at least partially with preservation fluid in some embodiments.

In a first embodiment of the present disclosure, a universal insect trap is described, where the universal insect trap includes a base having a cone-shaped body and a dome portion positioned on a top end of the base. A trap portion can be positioned between the base portion and the dome portion, the trap portion including an annular ring, a mounting portion, and a vial.

The annular ring can include a circumference similar to an inner circumference of an inner surface of the dome portion such that the annular ring and the dome portion define an interior space within the dome portion. The mounting portion can include a rim wider than a width of the outlet of the body such that the mounting portion retains the dome portion and the trap portion on the body, wherein the mounting portion comprises a plurality of navigation channels for ingress by at least one insect. The vial can be positioned below the mounting portion, such that the vial extends through the outlet and into the hollow interior of the base portion.

In a third embodiment of the present disclosure, a method is disclosed that comprises providing an insect trap, wherein the insect trap comprises a base having a cone-shaped body, the base having a sloped surface and a bottom portion wider than a top portion of the cone-shaped body, the base comprising a hollow interior and an outlet positioned on a top surface of the base portion; a dome portion having a semi-circular body for positioning on a top end of the base, the dome portion comprising an exterior surface that is partially opaque and partially transparent; and a trap portion positioned between the base portion and the dome portion.

The trap portion can include an annular ring, a mounting portion, and a vial in some embodiments. The annular ring can have a circumference similar to an inner circumference of an inner surface of the dome portion such that the annular ring and the dome portion define an interior space within the dome portion. The mounting portion can have a rim wider than a width of the outlet of the body such that the mounting portion retains the dome portion and the trap portion on the body, wherein the mounting portion comprises a plurality of navigation channels for ingress by at least one insect. The vial can be positioned below the mounting portion, where the vial extends through the outlet and into the hollow interior of the base portion. The annular ring and the mounting portion can define an aperture that slopes downward to an interior of the vial.

In various embodiments, the insect trap may include an aggregation pheromone (e.g., a sexual aggregation pheromone) positioned in the dome portion, the trap portion, or the base. The aggregation pheromone may be configured to emit a predetermined amount of pheromones to attract an insect over a predetermined period of time. In some embodiments, the pheromones are specific to at least one of whitefly, thrips, aphids, psyllids, leafhoppers, or other desired insects.

The aggregation pheromone may include a disc, glass vial, plastic vial, or bag of pheromones for attracting one or more vectors of insects in some embodiments, and may be attached to a top or a side of the top portion of the universal insect trap. For instance, in embodiments, may be positioned in the dome portion and/or inside the cone-shaped body. As may be appreciated, the placement of aggregation pheromones in the cone-shaped body may be beneficial for capturing whiteflies that enter from the bottom of the cone-shaped body. Moreover, the pheromone's constituent volatile chemicals will move upward and elute out of the entry holes providing a more attractive concentration gradient as a target to the responding insects, thereby increasing trap efficiency.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
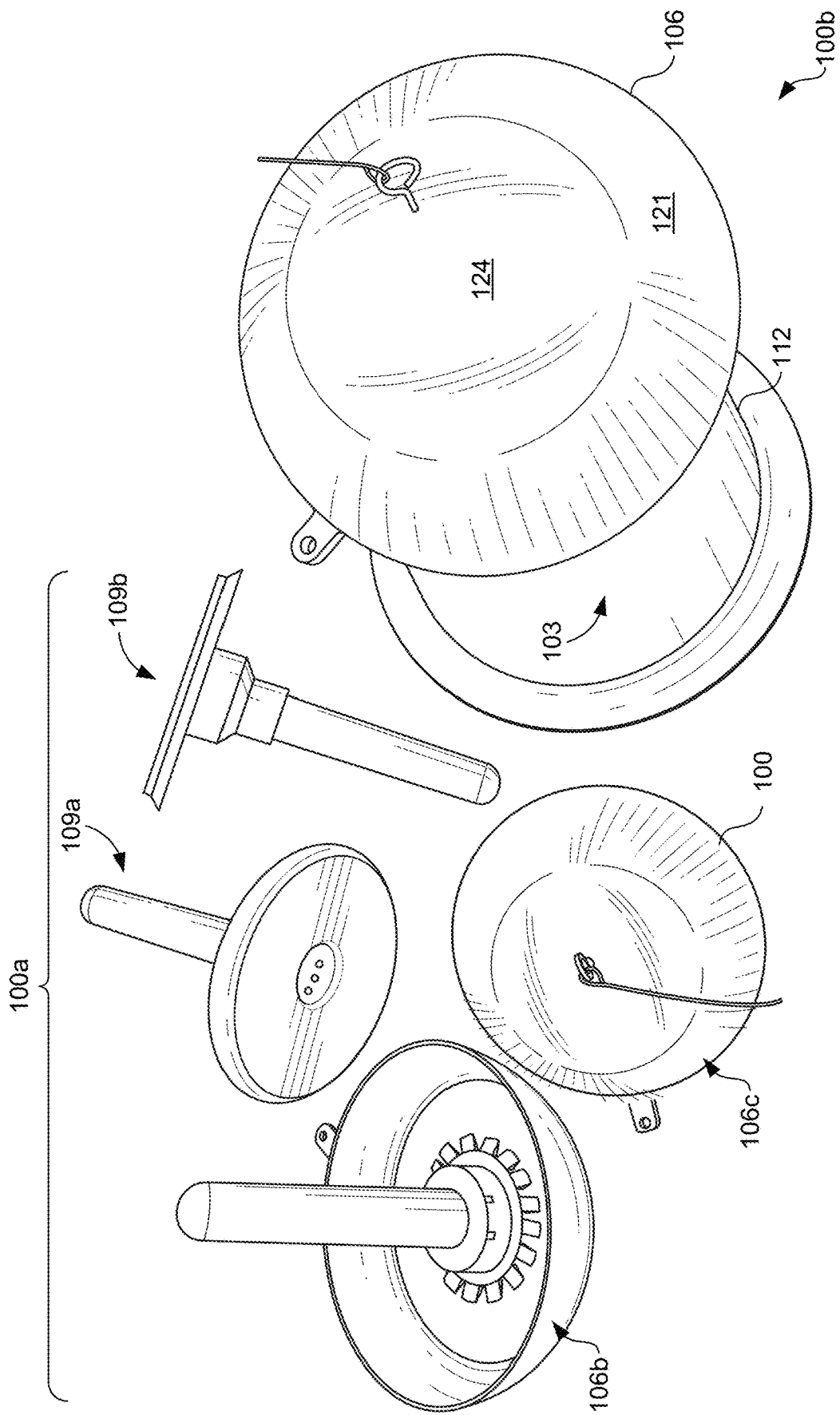
FIG. 1 is a perspective view of various components of a universal insect trap according to various embodiments of the present disclosure.

The present disclosure relates to a universal insect trap having multiple points of entry that is capable of capturing various types and sizes of insects through visual and/or chemical attraction. In accordance with the various embodiments described herein, the universal insect trap may be used to capture and preserve target species such that genomes can be analyzed for specimens, which is beneficial in determining infection rates, strains of a vector (e.g., whiteflies) or a pathogen, identifying associated microorganisms, determining or monitoring natural enemies, etc. The universal insect trap will also "live" collect (by omitting the liquid preservative) the target insects of interest, as well as for selected predators or parasites of these target pests and other species present in situ. In an experiment where the universal insect trap was placed in a citrus field in Gainesville, Florida, Rodolia cardinalis, the notable predator of cottony-cushion scale in situ, and Asian citrus psyllid were collected in large numbers.

Accordingly, a universal insect trap can include a base having a cone-shaped body, where the base includes a sloped surface. Further, the base can include a bottom portion wider than a top portion of the cone-shaped body. The base includes a hollow interior and an outlet positioned on a top surface of the base portion. A dome portion having a semi-circular body can be positioned on a top end of the base, where the dome portion includes an exterior surface that is partially opaque and partially transparent in some embodiments.

A trap portion can be positioned between the base portion and the dome portion, the trap portion including an annular ring. The annular ring can include a circumference similar to an inner circumference of an inner surface of the dome portion such that the annular ring and the dome portion define an interior space within the dome portion. Further, the trap portion can include a mounting portion having a rim wider than a width of the outlet of the body such that the mounting portion retains the dome portion and the trap portion on the body. The mounting portion can include a plurality of navigation channels for ingress by at least one insect.

Further, the trap portion can include a vial positioned below the mounting portion, the vial extending through the outlet and into the hollow interior of the base portion. The annular ring and the mounting portion can define an aperture that slopes downward to an interior of the vial, causing insects to fall into the vial which can be filled at least partially with preservation fluid in some embodiments.

The trap is cone-shaped, as opposed to prior traps having a cylindrical body, and the base can act as an attracting unit to attract the attention of an insect. In some examples, the base can have a height of approximately 21 cm and a width of approximately 16 cm at the bottom of the base.

By virtue of the sloped surface, the cone shape functions much better than traps that employ a cylindrical body, likely exploiting fundamental insect behaviors. The cone shape, specifically the wider bottom, also enables use of the trap for whiteflies whose trap response behavior is radically different from most other vector species although psyllids tend to fly and respond similarly in some proportion. For instance, while a majority of vector species land on the sides of the trap and walk vertically into externally opened entry holes at the top of the insect trap, whiteflies tend to fly off the plant vertically and enter the trap from the bottom, moving up toward the light at the cone top and entering the trap through the interior holes in response to light. Thus, the multiple entry aspect of the universal insect trap described herein serves to exploit different insect behaviors as well as increase trap efficiency.

In some embodiments, the universal insect trap can be yellow or other suitable color for attracting a particular insect. Insects are attracted to the trap by its color and manipulated to enter the traps by exploiting their attraction to sunlight or LED lights provided by placing a partially-painted and partially-clear plastic dome, which can be positioned on top of the cone-shaped body containing the entry holes that serve to enable proper mounting of all the pieces of the trap. To this end, light can enter through the partially-transparent portion of the dome and through the entry holes to attract the insects into the trap in combination with the specific physical structure of the holes.

Thus, lures are not needed for the trap to function efficiently, but of course can be used in conjunction with the universal insect trap to potentially improve the trap capture rate when available for a specific species. The opaque portion of the dome is also significant as an attractant, which can also be yellow or other color, as it entices the responding insects to land on the trap nearest the top of the cone-shaped body (e.g., less distance to get to the top entry holes) and the opaque area also shades the area underneath so as to help highlight the light coming in through the entry holes. Extensive experiments were conducted with the holes in their arrangement, size, slant (bias), and placement as described herein. The slanted entry is optimal for most species, but can be modified if necessary depending on the insect species.

As an example, a vector of the tomato spotted wilt virus in tomatoes and peanuts can be determined by capturing insects, such as the western flower thrips Franklinella occidentalis (WFT), at different crop fields or locations. The universal trap described herein can capture both the thrips along with their major predator, *Orius* spp. (minute pirate bugs). Adding lures affords capture of both species and exclusively WFT such that the producers can make a management decision based directly on the contents, while not having to identify the thrips by species. Additionally, the ratio of thrips/*Orius* spp. can be determined and used as a basis for various crop-related management decisions. In some embodiments, lures can include various pheromones, such as aggregation pheromones, that are adapted to lure insect vectors, such as thrips and whitefly, as will be discussed.

Figure 2:
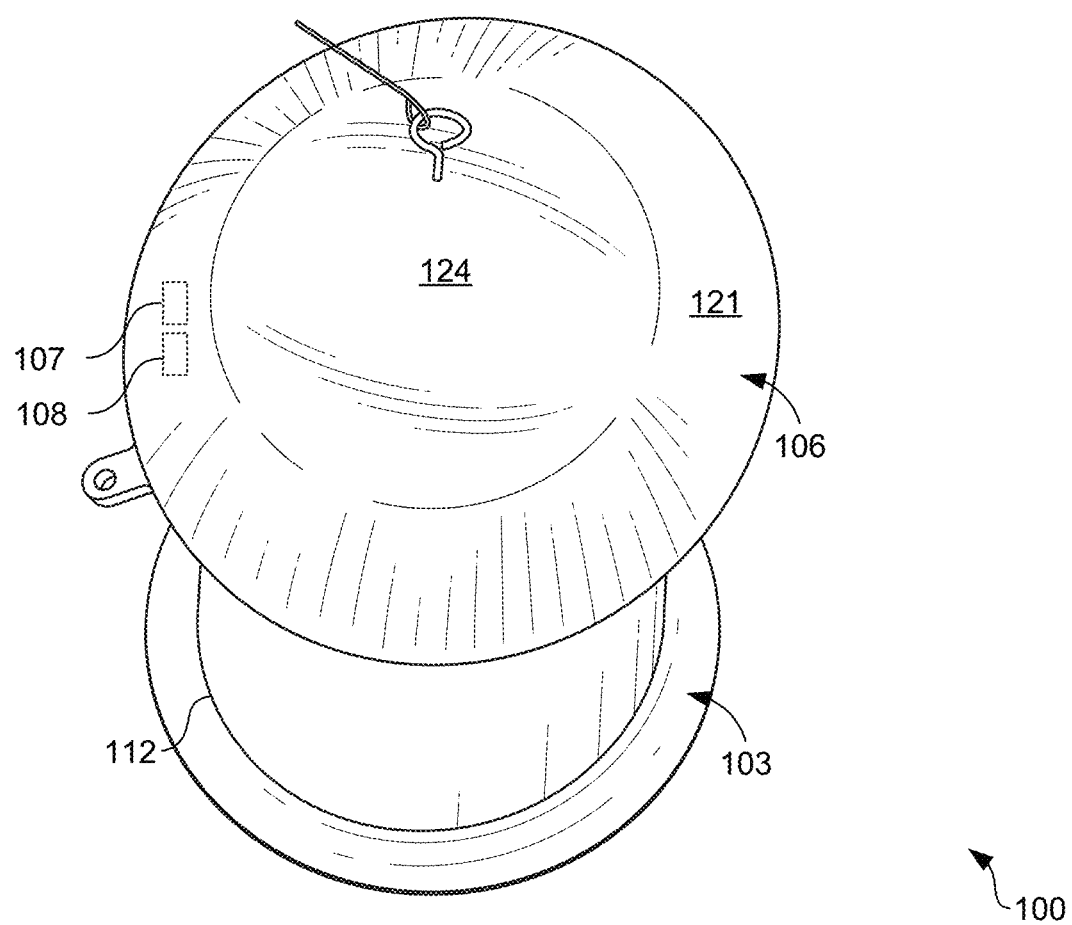
FIG. 2 is a top perspective view of the universal insect trap of FIG. 1 as assembled according to various embodiments of the present disclosure.

Turning now to FIG. 1, a perspective view of various components of a universal insect trap 100a are shown relative to an assembled form of the universal insect trap 100b according to various embodiments of the present disclosure. FIG. 2 further includes the assembled form of the universal insect trap 100. Referring first to FIG. 1, the universal insect trap 100 may include a base 103a, 103b, a dome portion 106a . . . 106c, and a trap portion 109a, 109b, among other components as may be appreciated. Different perspective views of the trap portion 109a, 109b are illustrated in FIG. 1; however, the universal insect trap 100 can include only a single base 103, dome portion 106, and trap portion 109 in some embodiments.

Figure 6:
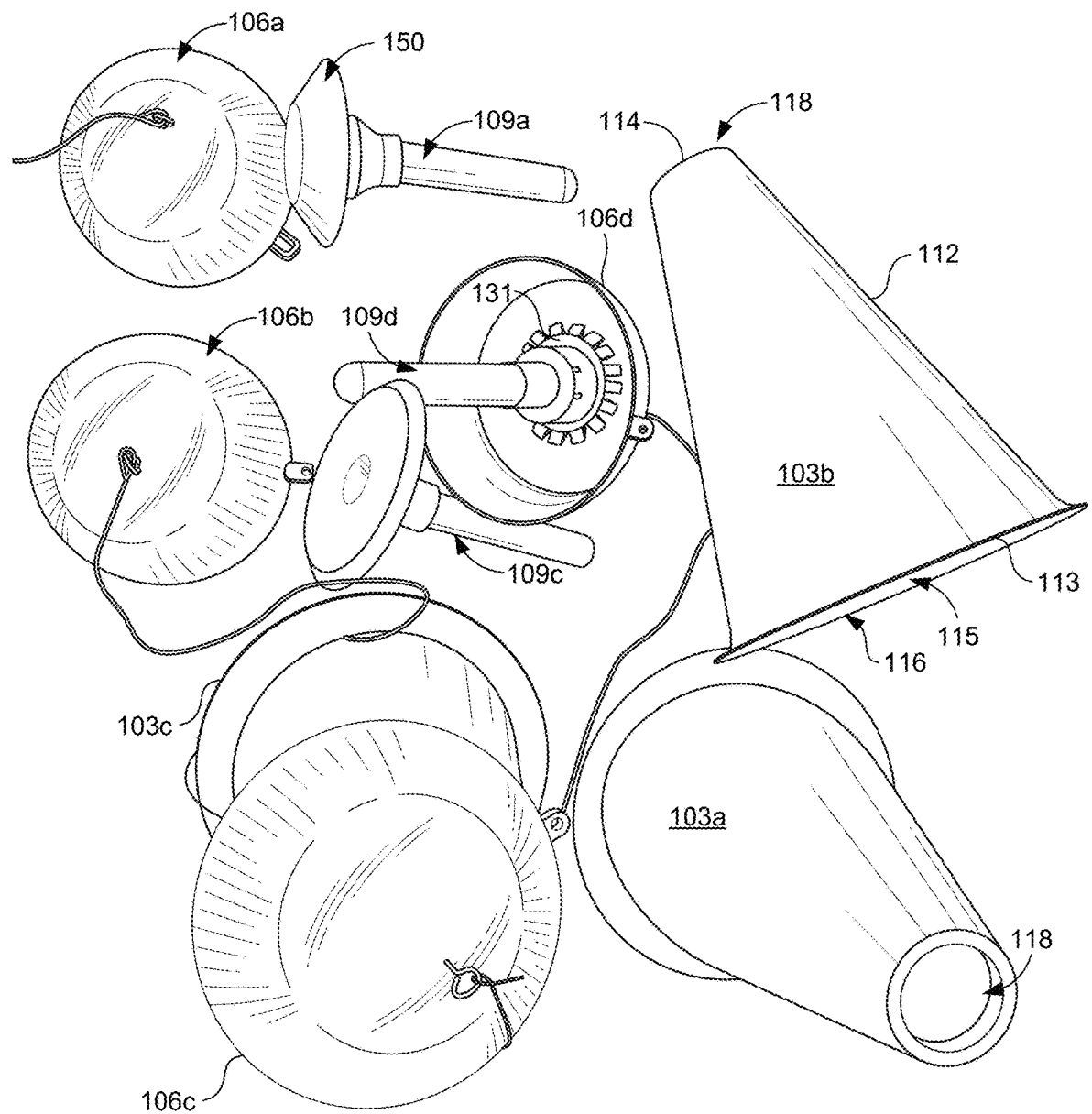
FIG. 6 is yet another perspective view of the various components of the universal insect trap of FIG. 1 according to various embodiments of the present disclosure.

Referring collectively to FIGS. 1 and 2, the base 103 of the universal insect trap 100 may include a base body 112 having a sloped surface. For instance, the exterior surface of the base body 112 slopes upward from the bottom to the top of the base body 112. As such, the bottom portion 113 of the base 103 is wider than a top portion 114 of the base body 112. To this end, in some embodiments, the base 103 can be described as having a cone-shaped body, where the base 103 has a sloped exterior surface sloping upward from the bottom 113 to the top portion 114 of the base body 112. Further, the base 103 may include a hollow interior 115 with an opening 116 at the bottom 113 and an outlet 118 positioned on a top surface of the base 103, as illustrated in FIG. 6.

Referring back to FIGS. 1 and 2, the dome portion 106 of the universal insect trap 100 can include a semi-circular body for resting on or otherwise being positioned on a top end of the base 103. In some embodiments, the dome portion 106 can include an exterior surface that is partially opaque and partially transparent. In other words, the dome portion 106 includes a portion having a substantially opaque exterior surface 121 and a portion having a substantially transparent exterior surface 124. For instance, the dome portion 106 may include an opaque portion and a transparent portion, as shown in FIG. 1 and FIG. 2.

In some embodiments, the universal insect trap 100 can be formed of a plastic cylindrical base 103 having approximately 6" width by a 9" height (7.5×22.5 cm), where the base 103 encloses a trap portion 109. The trap portion 109 can be described as having a recessed aperture 139 that acts as a funnel and a vial 133 positioned under an annular ring 127. The annular ring 127 has a plurality of holes 136 (also referred to herein as "navigation channels" 136 or "entrance holes") positioned along the outer circumference. The navigation channels 136 may be curved or straight in some embodiments.

The trap portion 109 can be covered at the top with the dome portion 106, which can be formed of half of a clear plastic ornament in some embodiments. The dome portion 106 can be painted (e.g., yellow) such that the sides of the dome portion 106 are opaque, while the top of the dome portion 106 is open to light penetration down to the entry holes in the annular ring 127 and inside the dome portion 106. However, in some embodiments, the universal insect trap 100 can include a light emitting element 107 (e.g., a light emitting diode or LED) and a battery 108 to power the light emitting element.

The interior collector vial protects the preservative fluid from sunlight and heat, which highly reduces the sunlight destruction of the collected specimens as well as reduces the heat from direct exposure. As such, the universal insect trap 100 can be left in the field longer without having to tend it as well as providing better information about the collected specimens. In some embodiments, the preservation liquid includes ethyl alcohol, but other preservation liquids can be employed. For instance, in the future with insects being genetically modified, the chemical preservatives required may be more sensitive to heat and sunlight. As such, in some embodiments, the vial may have special characteristics, such as an increased thickness, formed of synthetic or other materials, etc. As such, the universal insect trap 100 can be easily modified to meet such needs.

By virtue of the large shape and color of the base 103, target insects are induced to navigate along the sloped surface towards the trap portion 109 and the dome portion 106, thereby entering holes 136 to inside the trap portion 109 and, ultimately, the vial 133 by virtue of the recessed aperture 139. The angle of the base 103 is important to an insect's behavior on the trap as it provides a slope that is less steep; therefore, it is easier for an insect to hang on to as opposed to a substantially vertical cylinder. It also better encourages the landing insects to walk upward toward the top of the trap rather than drop off; that increases trap efficiency. As such, in various embodiments, the slope or angle of incline on the base 103 can be approximately 15 degrees.

In some embodiments, the trap portion 109 (or the annular ring 127 thereof) can be formed using three-dimensional printing or other suitable fabrication method. The annular ring 127 can include the entry holes 136 over the top exterior of the cylindrical base 103 while enabling better attachment of the components. A number of configurations were tested and a cylindrical base 103 as described with the dome portion 106, painted yellow on the sides inside and outside, were successful in capturing a vast number of insects. In some examples, the annular ring 127 can be formed of an acrylonitrile butadiene styrene polymer. The yellow color can be used for collecting Asian citrus psyllid along with most other small, plant-feeding insect vectors, in some embodiments.

The cone shape of the base 103 acts as a primary attractor for the insects. This attraction is further enhanced by the opaque, bottom portion of the dome, as shown in FIG. 1 (see reference numeral 121). The dome, as positioned above the cone 103, serves to enhance both the trap's total visual silhouette and attraction provided by the cone 103 alone.

The annular ring 127 can contain entry holes 136, as well as a recessed aperture 139 that acts as a collection funnel that directs insects inside the vial 133. The annular ring 127 also acts as a fitting that enable attachments of the annular ring 127 to the top of the base 103 and/or the dome portion 106.

In experiments conducted in accordance with the embodiments described herein, most of the physical properties of the annular ring 127 were modified and tested including color, entry hole size, entry hole orientation, angle of incidence of the ends of the entry holes 136, number of entry holes 136, and placement of the entry holes 136. The annular ring 127 shown herein was selected such that insects can enter from the exterior of the base 103 under the dome portion 106 or via another set of holes such that insects can enter the universal insect trap 100 from below. In other words, the universal insect trap 100 includes multiple entry points (or "double" entry points in some embodiments).

Figure 3:
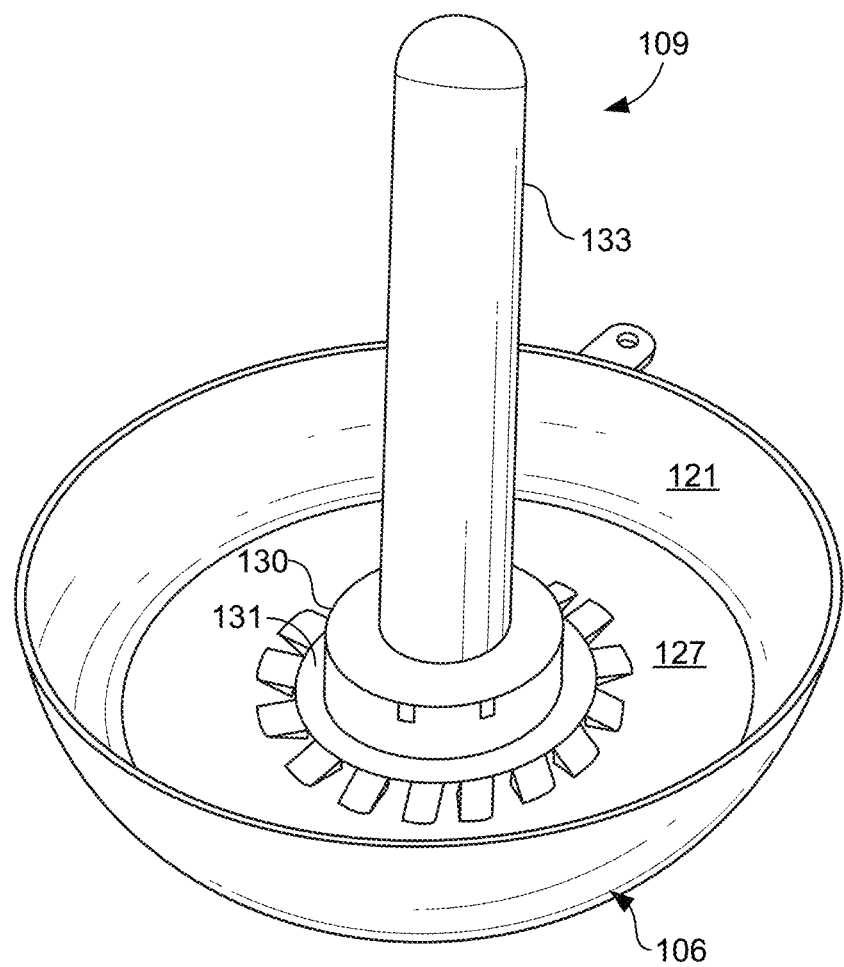
FIG. 3 is a bottom perspective view of a trap portion and a dome portion of the universal insect trap according to various embodiments of the present disclosure.
Figure 4:
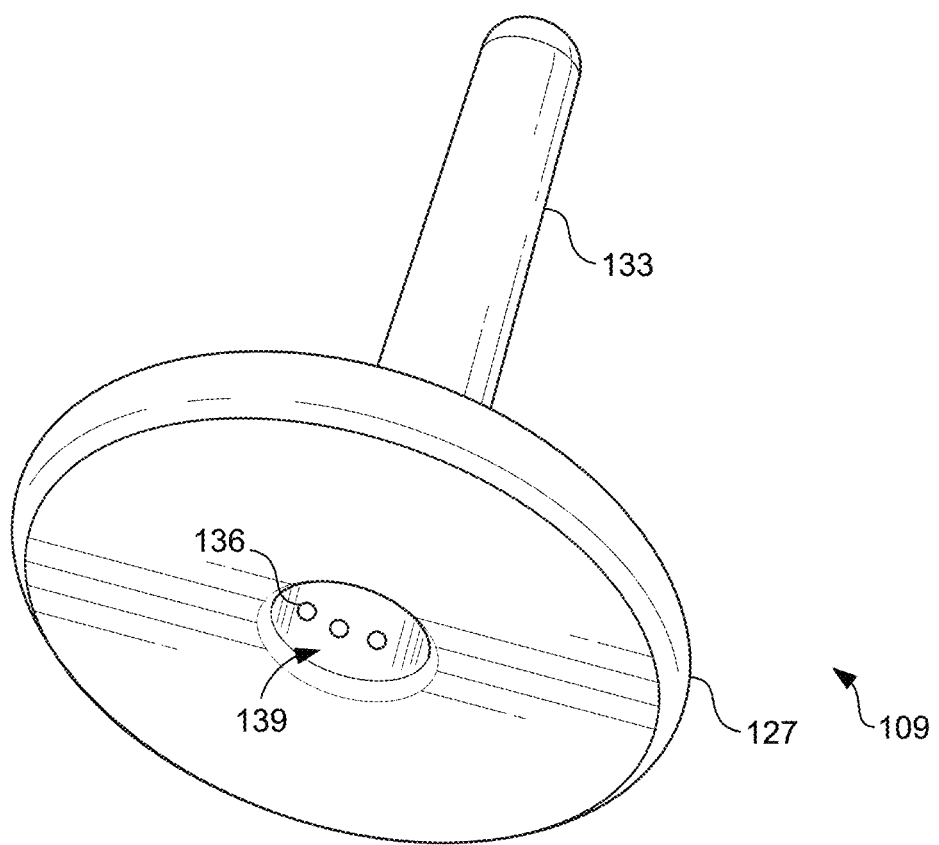
FIG. 4 is a perspective view of the trap portion of the universal insect trap according to various embodiments of the present disclosure.
Figure 5B:
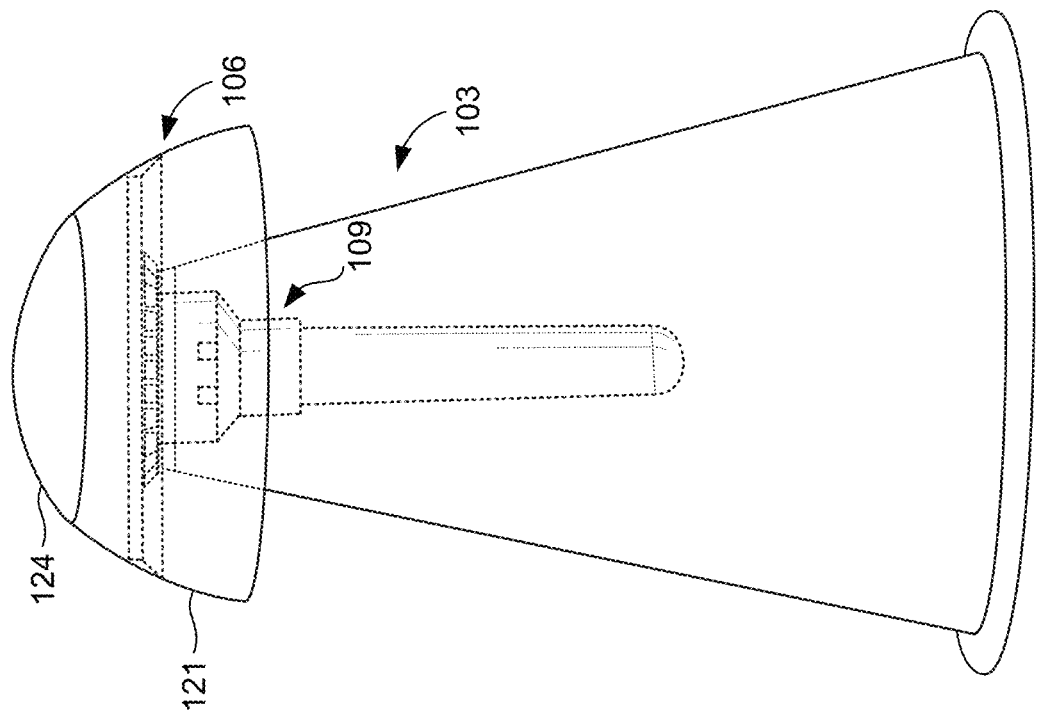
FIGS. 5A and 5B illustrate the trap portion of the universal insect trap shown in another perspective view (FIG. 5A) and in broken line view (FIG. 5B) with the dome and the base illustrating an assembled form of the universal insect trap according to various embodiments of the present disclosure.
Figure 5A:
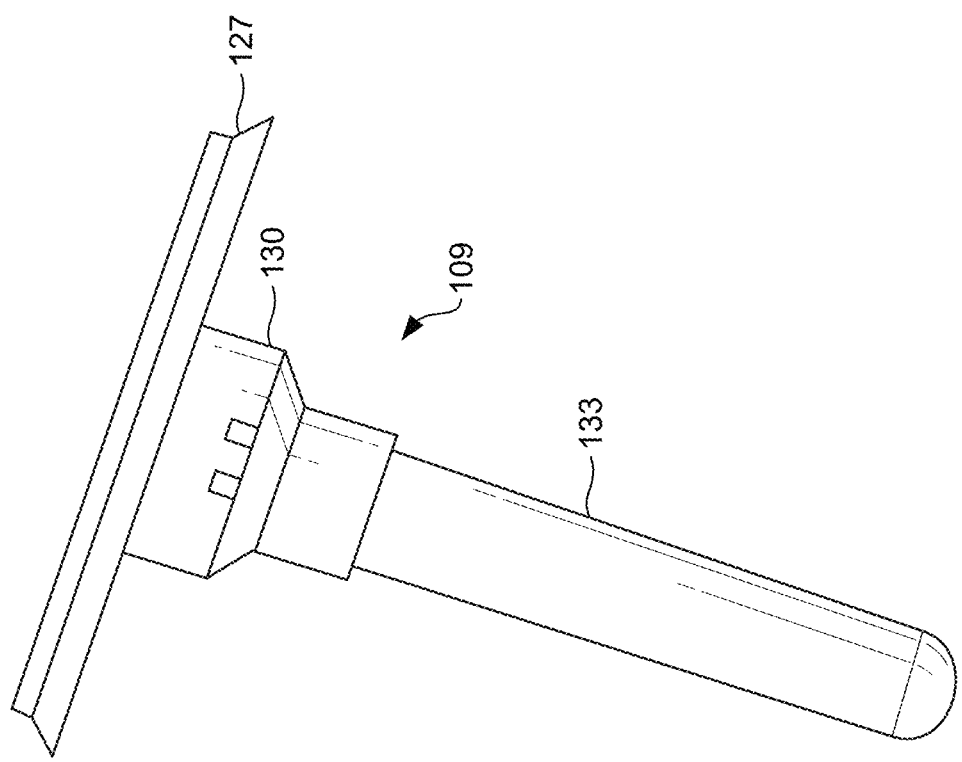

Referring now to FIGS. 3-5, different perspective views of the trap portion 109 are shown. FIG. 3 further illustrates that coupling of the trap portion 109 with an interior of the dome portion 106, as will be described. For instance, when the universal insect trap 100 is fully assembled, the trap portion 109 can be positioned between the base 103 and the dome portion 106 (FIG. 5B).

The annular ring 127 of the universal insect trap 100 can also include a sloped annular ring 150, as shown in FIG. 6, which is an alternative to the flat annular ring 127 also shown in FIG. 6. Notably, the annular ring 150 is sloped on the edges and formed to create a funnel shape above the entry 139. The shape of the sloped annular ring 150 makes insects fall into the opening 139 and, as such, the insects are preserved faster.

Further, the trap portion 109 can include an annular ring 127, a mounting portion 130, and a vial 133. As shown in FIG. 3, the annular ring 127 can include a circumference similar to an inner circumference of an inner surface of the dome portion 106 such that the annular ring 127 and the dome portion 106 define an interior space within the dome portion 106.

The mounting portion 130 can include a rim 131 wider than a width of the outlet 118 of the base 103 such that the mounting portion 130 retains the dome portion 106 and the trap portion 109 on the base 103. The mounting portion 130 can include a plurality of holes 136, or navigation channels 136, for ingress by at least one insect. In some examples, the navigation channels 136 are positioned in a recessed or nested portion of the annular ring 127 angling downwards towards the vial 133.

When assembled, the vial 133 can be positioned below the mounting portion 130 such that the vial 133 extends through the outlet 118 of the base 103 and into the hollow interior 115 of the base 103, as better illustrated in FIG. 6. Referring back to FIG. 4, as shown, the annular ring 127 and the mounting portion 130 can define a recessed aperture 139 that slopes downward to an interior of the vial 133. In some embodiments, the vial 133 can include an amount of preservation liquid positioned in the interior of the vial 133.

Figure 7:
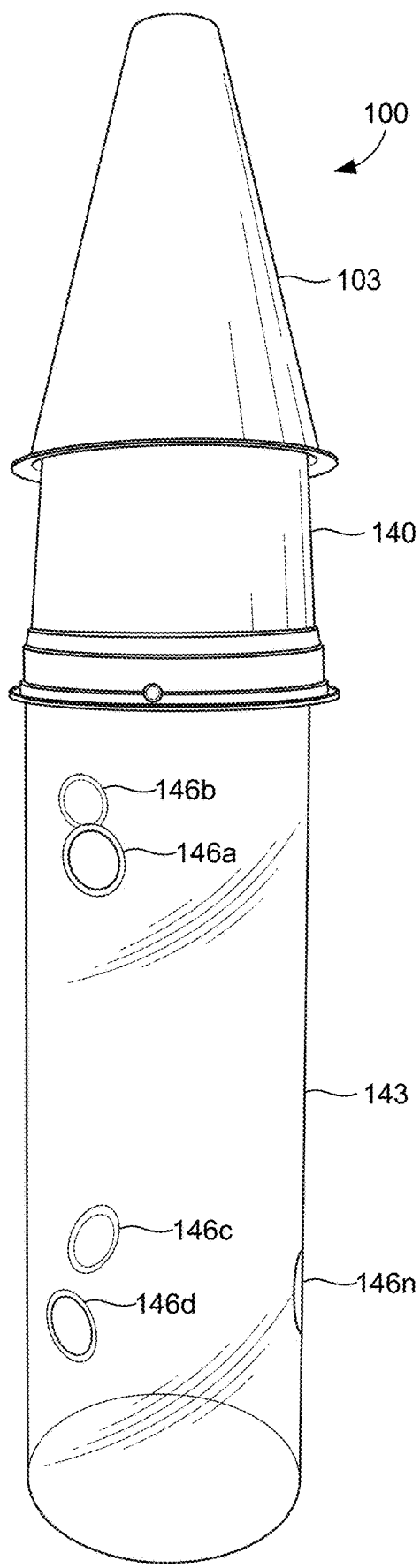
FIG. 7 is a perspective view of the universal insect trap of FIG. 1 positioned on an elongated cylinder according to various embodiments of the present disclosure.

Turning now to FIG. 7, a portion of the base 103 of the universal insect trap 100 is shown positioned on a collection tube 143. The collection tube 143 can include an elongated cylinder that can be opaque or transparent in some embodiments. While only the base 103 of the universal insect trap 100 is shown, it is understood that all components of the universal insect trap 100 can be combined with the funnel 140 and the collection tube 143. Like the trap portion 109, the collection tube 143 can include a plurality of holes 146a . . . 146n for entry by at least one insect.

Figure 8:
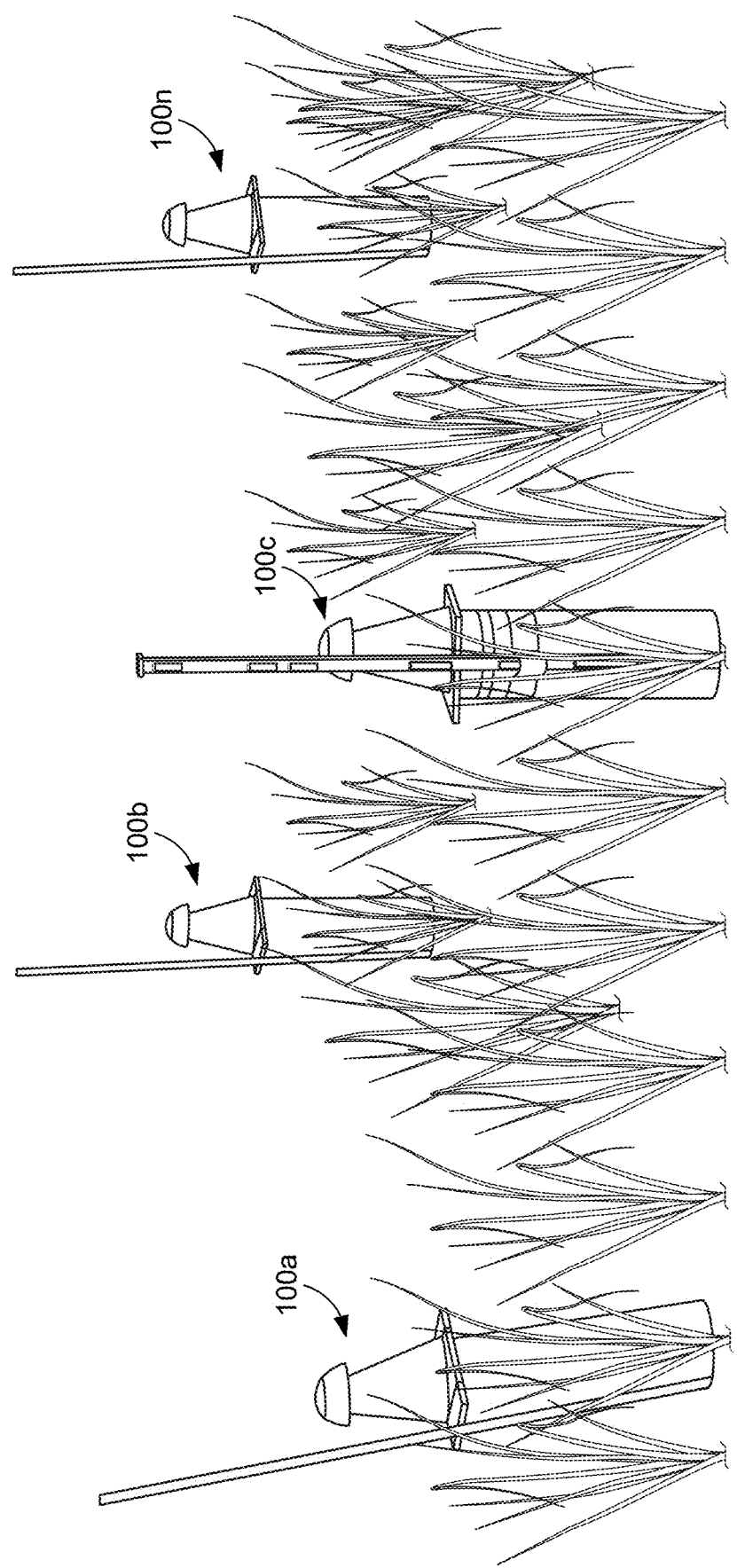
FIG. 8 is a crop field including multiples ones of the universal insect trap of FIG. 1 according to various embodiments of the present disclosure.
Figure 9A:
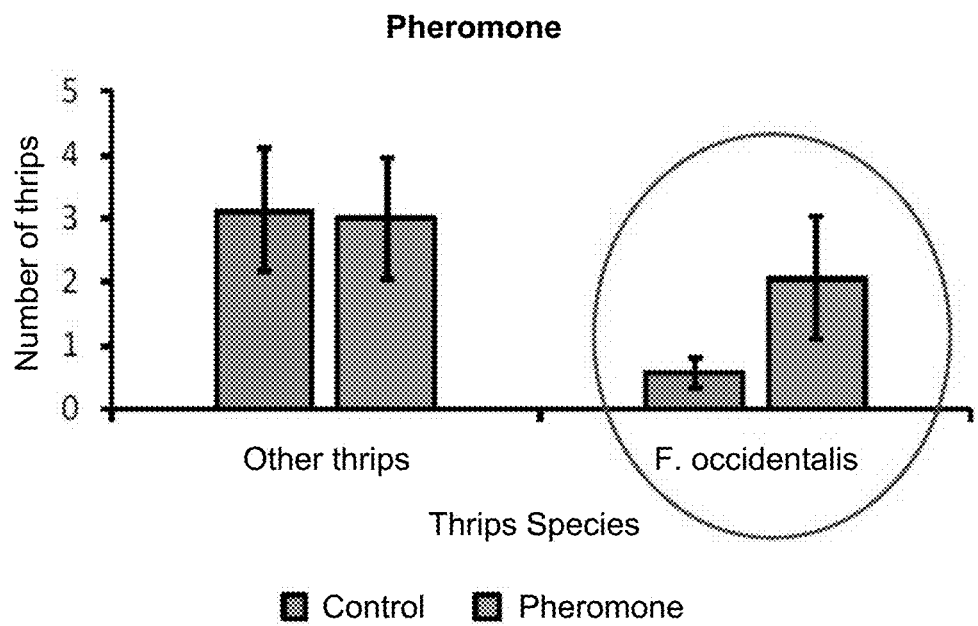
FIGS. 9A-9D are charts showing experimental results regarding use of aggregation pheromones in different embodiments of the universal insect trap versus a control experiment.
Figure 9B:
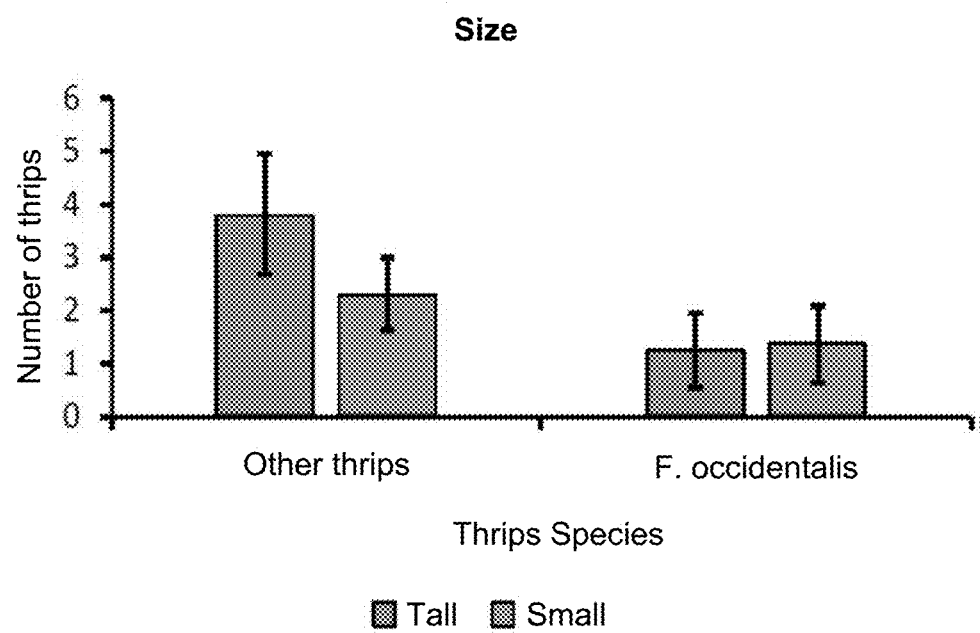
Figure 9C:
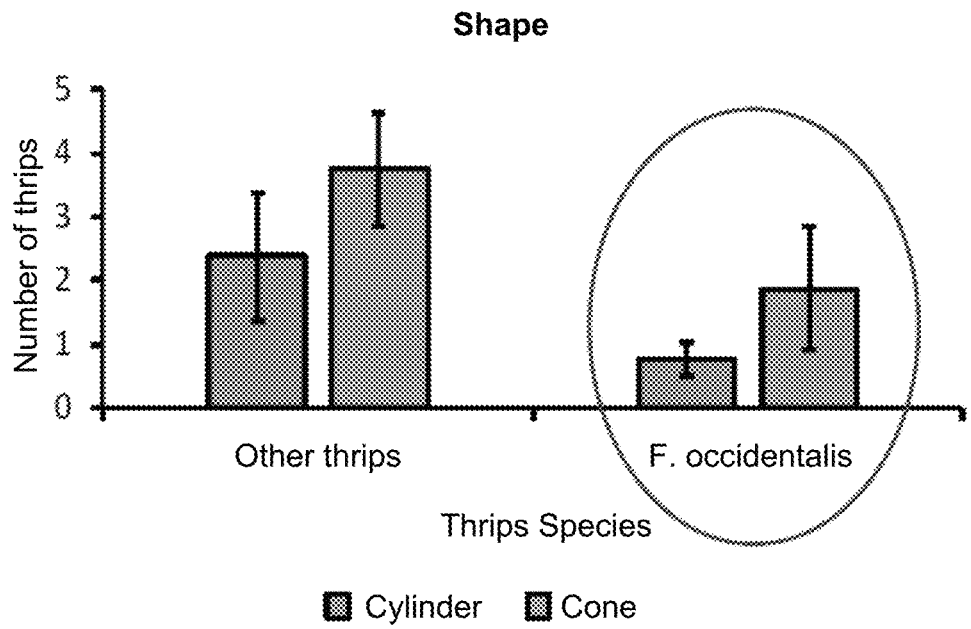
Figure 9D:
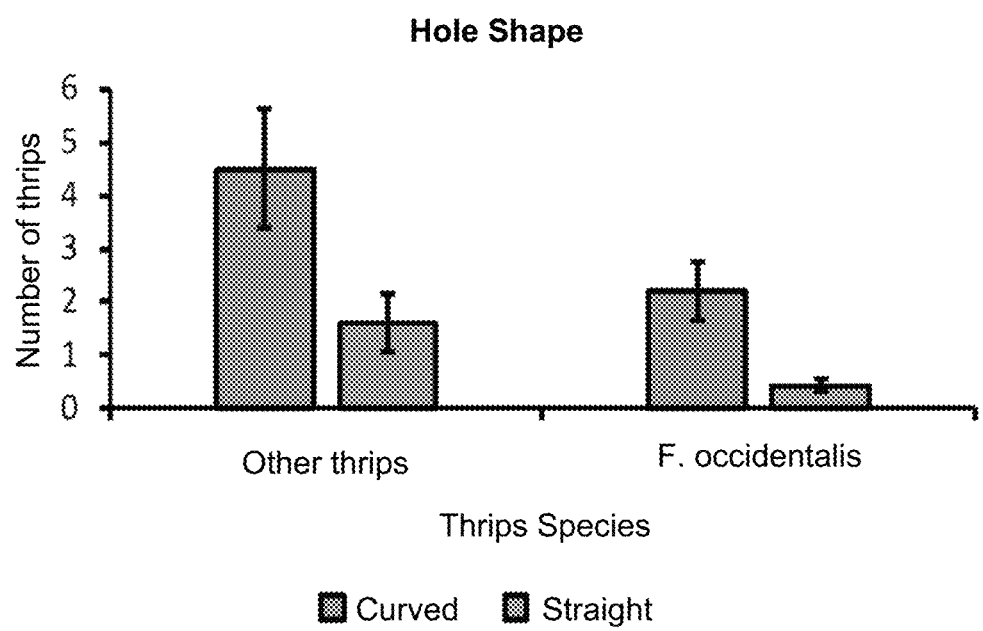

FIG. 8 is a crop field including multiples ones of the universal insect trap 100 of FIGS. 1-7 according to various embodiments of the present disclosure. While the plants are shown outside of the collection tubes 143, it is understood that the collection tubes 143 can be placed over an entirety or a portion of a plant. In any event, FIG. 8 illustrates the universality of the universal insect trap 100. First, the universal insect trap 100 collects most of the small insect disease vectors as well as many other insects from its top and bottom all with one trap. Second, the universal insect trap 100 is a capture-and-preserve type of insect trap that can be added as a capture and preserve component to many other kinds of traps. FIG. 8 illustrates onion plants. The onions in this case can be enclosed in the large cylindrical collection tube 143 that the universal insect trap 100 sits on top of and captures the insects on the plants which cannot go anywhere but up into the universal insect trap 100. This is referred to as an insect-emergence trap and could be built in many different forms and shapes. For instance, a sleeve cage can be positioned over a tree limb such that the universal insect trap 100 described herein is positioned at the top of an inverted funnel shaped portion, or a floating pyramid structure on water or over soil with the universal insect trap 100 at the top, etc. This makes the utility of the universal insect trap 100 much greater and is only limited by need of the user.

Figure 10:
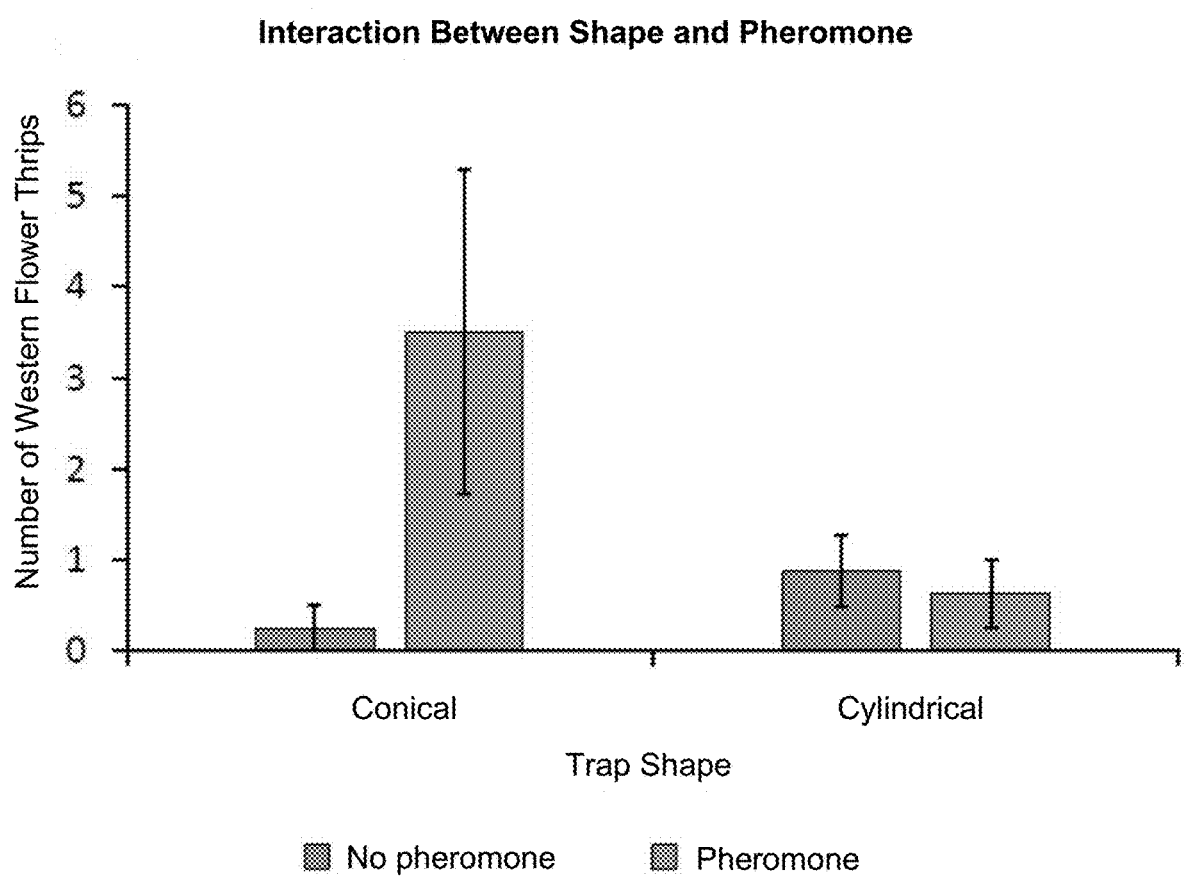
FIG. 10 is a chart showing experimental results regarding use of aggregation pheromones in different embodiments of the universal insect trap versus a control experiment.

FIGS. 9A-9D are charts showing experimental results regarding use of aggregation pheromones in different embodiments of the universal insect trap 100 versus a control experiment. Similarly, FIG. 10 is a chart showing experimental results regarding use of aggregation pheromones in different embodiments of the universal insect trap 100 versus a control experiment. As noted above, in some embodiments, lures can include various pheromones, such as aggregation pheromones, that are adapted to lure insect vectors, such as thrips and whitefly.

For instance, in some embodiments, the universal insect trap 100 may include an aggregation pheromone placed on the dome portion 106, the trap portion 109, or inside the base 103. The aggregation pheromone may emit a predetermined amount of pheromones over a predetermined period of time, where the aggregation pheromones are specific to and are adapted to aggregate at least one of whitefly, thrips, aphids, psyllids, and leafhoppers (and/or other desired species). As may be appreciated, the pheromone's constituent volatile chemicals will move upward and elute out of the entry holes providing a more attractive concentration gradient as a target to the responding insects, thereby increasing trap efficiency.

Generally, in Florida and Southeastern United States agriculture, there are three insect species of concern, such as *Thrips palmi* (e.g., melon thrips), *Frankliniella schultzei* (e.g., tomato thrips or blossom thrips), and *Frankliniella occidentalis* (e.g., western flower thrips). These species are known for their small size (<1 mm in length), ability to develop insecticide resistance, short generation time, high mobility, and their herbivorous nature on a wide range of plants. Thrips are known to damage various crops, such as tomatoes.

Specifically, thrips are known to cause dimples, flecking, ring spots, and other deformities on various crops, such as tomatoes, due to oviposition and/or tospovirus infection. For instance, thrips larvae acquire tospoviruses and the thrips adults transmit the virus to various crops. As may be appreciated, insecticidal control of thrips adults does not prevent virus transmission.

Traditionally, thrips densities in crops, such as flowers, had to be determined by picking the flowers and placing them on a white board. It is difficult or even impossible to distinguish thrips species in the field due to their size. As such, crops, such as flowers, must be placed in containers with 70% alcohol to identify insects under a microscope. As such, improving sampling and identification of thrips and other insect vectors in crops, such as tomatoes, is desirable to track disease vectors and improve crop yields.

In Spring 2018 and 2019, the universal insect trap 100 described herein was used in an experiment in an organic tomato field. Specifically, thirty-two traps were deployed in two blocks distributed in a factorial design. The four factors tested included trap size, trap shape, entrance hole shape, and thrips pheromone. The results of the experiment are shown in FIGS. 9A-9D and FIG. 10. As can be seen, there was only 17% western flower thrips in the thrips population captured in other traps, whereas 73% of the thrips collected in conical traps with curved holes (e.g., the universal insect trap 100 described herein) and baited with thrips pheromone were western flower thrips. The use of pheromones and a conical-shaped insect trap shows substantial increases in capture of insects, such as western flower thrips.

Accordingly, in various embodiments, the universal insect trap 100 may include an aggregation pheromone, such as a sexual aggregation pheromone, positioned in one or more of the dome portion 106, the trap portion 109, or the base 103. The aggregation pheromone may include one that emits a predetermined amount of pheromones to attract an insect over a predetermined period of time. In some embodiments, the pheromones are specific to at least one of whitefly insects and thrips insects.

The aggregation pheromone may include a disc, glass vial, plastic vial, or bag of pheromones for attracting one or more vectors of insects in some embodiments, and may be attached to a top or a side of the top portion of the universal insect trap 100. For instance, in embodiments, may be positioned in the dome portion 106 and/or inside the cone-shaped body of the base 103. As may be appreciated, the placement of aggregation pheromones in the cone-shaped body may be beneficial for capturing whiteflies that enter from the bottom of the cone-shaped body.

The experiments discovered that, when monitoring for a major thrips vector of tomato-spotted wilt virus (TSWV), *Frankliniella occidentalis* (e.g., western flower thrips), and the pheromone of this species was included in the universal insect trap 100, other thrips species that are commonly also captured are unexpectedly repelled, so the universal insect trap 100 catches only *F. occidentalis*. TSWV infects nearly two hundred species of plants in both field and greenhouse production including tomato, eggplant, tobacco, peanut, peas, beans, nursery and greenhouse plants, etc. Nine species of thrips can vector TSWV, but *F. occidentalis* is the major vector.

This is a notable finding because identification of the three to five thrips species that show up in the other types of traps has to be performed using a microscope, which is undesirable for growers or technical advisors to perform. Thus, by using the universal insect trap 100 described herein, farmers or other interested parties can make an immediate field count of a key vector, because it is the only species trapped when its pheromone is present in the universal insect trap 100. As such, decisions about presence, absence, and quantity of an insect vector can immediately lead to more timely grower recommendations about when and if insect or disease suppression tactics are warranted.

It is understood that the components described herein can be formed of steel or other suitable material. The coupling of any two or more items may be accomplished by welding or other suitable method. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An insect trap, comprising:
   a base having a cone-shaped body extending from a bottom portion to a top portion, the base having a sloped surface with the bottom portion wider than the top portion of the cone-shaped body, the base comprising a hollow interior having an opening at the bottom portion of the base and an outlet positioned on a top surface of the base;
   a dome portion having a semi-circular body having an outer diameter, the dome portion comprising an inner surface and an exterior surface that is partially opaque and partially transparent;
   a trap portion comprising:
      an annular ring extending radially outward from a first end of the trap portion, the annular ring positioned within the inner surface of the dome portion, the annular ring having a flat upper surface and an outer circumference similar to an inner circumference of the inner surface of the dome portion such that the annular ring and the dome portion define an interior space within the dome portion, and the outer diameter of the dome portion is greater than the inner circumference of the dome portion;
      a mounting portion being positioned adjacent to an annular ring opening defined by the annular ring, a first portion of the mounting portion having a rim wider than a width of the outlet of the cone-shaped body such that the mounting portion retains the dome portion and the trap portion on the cone-shaped body when installed on the base, where a width of the outer circumference of the annular ring is greater than a width of the rim;
      an elongated, cylindrical vial comprising a distal end and a proximal end, the vial supported by the mounting portion at the proximal end with the distal end of the vial extending below a second portion of the mounting portion and into the hollow interior of the base when installed on the base, and the second portion of the mounting portion being narrower in width than the first portion of the mounting portion, a width of the vial less than the width of the second portion of the mounting portion, the trap portion further comprising externally opened entry holes positioned in a recessed or nested portion of the annular ring over the top portion of the base adjacent to the rim of the mounting portion, and interior entry holes accessible from the bottom portion of the base of the insect trap when installed on the base, the recessed or nested portion of the annular ring extending from the annular ring opening; and wherein the annular ring opening and an inner surface of the mounting portion define a recessed aperture that slopes downward to the proximal end of the vial where the recessed aperture is configured to funnel insects inside an interior of the vial when installed on the base; and an aggregation pheromone positioned in the insect trap that emits a predetermined amount of pheromones over a predetermined period of time.

2. The insect trap of claim 1, further comprising an amount of preservation liquid positioned in the vial.

3. The insect trap of claim 1, wherein the aggregation pheromone attracts at least one of: whitefly insects, psyllid insects, aphid insects; insects; and leafhopper insects.

4. An insect trap, comprising:
 a base having a cone-shaped body extending from a bottom portion to a top portion, the base comprising a hollow interior having an opening at the bottom portion of the base and an outlet positioned on a top surface of the base;
 a dome portion comprising an inner surface and an exterior surface; and
 a trap portion comprising:
  an annular ring positioned within the inner surface of the dome portion, the annular ring having a flat upper surface and an outer circumference similar to an inner circumference of the inner surface of the dome portion such that the annular ring and the dome portion define an interior space within the dome portion, and the outer diameter of the dome portion is greater than the inner circumference of the dome portion;
  a mounting portion being positioned adjacent to an annular ring opening defined by the annular ring, a first portion of the mounting portion having a rim wider than a width of the outlet of the cone-shaped body such that the mounting portion retains the dome portion and the trap portion on the cone-shaped body when installed on the base, where a width of the outer circumference of the annular ring is greater than a width of the rim; and
  an elongated, cylindrical vial comprising a distal end and a proximal end, the vial supported by the mounting portion at the proximal end with the distal end of the vial extending below a second portion of the mounting portion and into the hollow interior of the base when installed on the base, the second portion of the mounting portion being narrower in width than the first portion of the mounting portion, a width of the vial less than the width of the second portion of the mounting portion, the trap portion further comprising externally opened entry holes positioned in a recessed or nested portion of the annular ring over the top portion of the base adjacent to the rim of the mounting portion, and interior entry holes accessible from the bottom portion of the base of the insect trap when installed on the base, the recessed or nested portion of the annular ring extending from the annular ring opening.

5. The insect trap of claim 4, wherein the base has a sloped surface and the bottom portion is wider than a top portion of the cone-shaped body, the base comprising the hollow interior and the outlet positioned on the top surface of the base.

6. The insect trap of claim 4, wherein the dome portion has a semi-circular body.

7. The insect trap of claim 4, wherein the dome portion comprises an exterior surface comprising a partially opaque portion and a partially transparent portion, wherein the dome portion and the trap portion are positioned relative to one another such that when light penetrates through the partially-transparent portion of the dome, the light further penetrates through the entry holes of the trap portion to attract the insects into the trap.

8. The insect trap of claim 4, further comprising an amount of preservation liquid positioned in the vial.

9. The insect trap of claim 4, wherein the annular ring opening and an inner surface of the mounting portion define a recessed aperture that slopes downward to an interior of the vial.

10. The insect trap of claim 4, further comprising an aggregation pheromone positioned in the insect trap that emits a predetermined amount of pheromones over a predetermined period of time.

11. The insect trap of claim 10, wherein the aggregation pheromone attracts at least one of: whitefly insects, psyllid insects, aphid insects; insects; and leafhopper insects.

12. The insect trap of claim 4, further comprising at least one lighting element and a battery powering the at least one lighting element, the at least one lighting element comprising at least one light emitting diode (LED).

13. A method, comprising:
 providing an insect trap, comprising:
  a base having a cone-shaped body extending from a bottom portion to a top portion, the base comprising a hollow interior having an opening at the bottom portion of the base and an outlet positioned on a top surface of the base;
  a dome portion comprising an inner surface and an exterior surface; and
  a trap portion comprising:
   an annular ring positioned within the inner surface of the dome portion, the annular ring having an outer circumference similar to an inner circumference of the inner surface of the dome portion such that the annular ring and the dome portion define an interior space within the dome portion, and the outer diameter of the dome portion is greater than the inner circumference of the dome portion;
   a mounting portion being positioned adjacent to an annular ring opening defined by the annular ring, a first portion of the mounting portion having a rim wider than a width of the outlet of the cone-shaped body such that the mounting portion retains the dome portion and the trap portion on the cone-shaped body when installed on the base, where a width of the outer circumference of the annular ring is greater than a width of the rim; and
   an elongated, cylindrical vial comprising a distal end and a proximal end, the vial supported by the mounting portion at the proximal end with the distal end of the vial extending below a second portion of the mounting portion and into a hollow interior of the base when installed on the base, the second portion of the mounting portion being narrower in width than the first portion of the mounting portion, a width of the vial less than the width of the second portion of the mounting portion, the trap portion further comprising externally opened entry holes positioned in a recessed or nested portion of the annular ring over the top portion of the base adjacent to the rim of the mounting portion, and interior entry holes accessible from the bottom portion of the base of the insect trap when installed on the base, the recessed or nested portion of the annular ring extending from the annular ring opening; and positioning the base on a supporting structure or surface; and installing the dome portion and the trap portion on the base.

14. The method of claim 13, wherein the base has a sloped surface and the bottom portion wider than the top portion of the cone-shaped body, the base comprising the hollow interior and the outlet positioned on the top surface of the base.

15. The method of claim 13, wherein the dome portion has a semi-circular body and the dome portion comprises an exterior surface that is partially opaque and partially transparent, and the dome portion and the trap portion being positioned relative to one another such that when light penetrates through a partially-transparent portion of the dome, the light further penetrates through the entry holes of the trap portion to attract the insects into the trap.

16. The method of claim 13, further comprising placing an amount of preservation liquid in the vial.

17. The method of claim 13, wherein the insect trap comprises at least one lighting element and a battery powering the at least one lighting element, the at least one lighting element comprising at least one light emitting diode (LED).

18. The method of claim 13, further comprising placing an aggregation pheromone in the insect trap, the aggregation pheromone emitting a predetermined amount of pheromones over a predetermined period of time.

19. The method of claim 18, wherein the aggregation pheromone is specific to at least one of: whitefly insects and insects.

20. The method of claim 18, wherein the aggregation pheromone is specific to at least one of: whitefly insects, psyllid insects, aphid insects, insects, and leafhopper insects.

* * * * *